US006908077B2

(12) United States Patent
Sawdon

(10) Patent No.: US 6,908,077 B2
(45) Date of Patent: Jun. 21, 2005

(54) CLAMP WITH SWINGING AND LINEAR MOTION

(75) Inventor: Edwin G Sawdon, St. Clair, MI (US)

(73) Assignee: BTM Corporation, Marysville, MI (US)

( * ) Notice: Subject to any disclaimer, the term of this patent is extended or adjusted under 35 U.S.C. 154(b) by 161 days.

(21) Appl. No.: 10/255,924

(22) Filed: Sep. 26, 2002

(65) Prior Publication Data

US 2004/0061268 A1 Apr. 1, 2004

(51) Int. Cl.[7] .................................................. B23Q 3/03
(52) U.S. Cl. .......................................................... 269/32
(58) Field of Search .......................... 269/32, 228, 232, 269/233, 285, 91, 93

(56) References Cited

U.S. PATENT DOCUMENTS

| | | | | |
|---|---|---|---|---|
| 1,948,799 A | | 2/1934 | Oyster | |
| 3,545,050 A | * | 12/1970 | Blatt et al. | 269/228 |
| 4,331,326 A | * | 5/1982 | Strouss | 269/93 |
| 4,396,183 A | | 8/1983 | Lymburner | |
| 4,400,969 A | * | 8/1983 | Specktor | 269/71 |
| 4,445,676 A | | 5/1984 | Tunkers | |
| 4,637,597 A | | 1/1987 | McPherson et al. | |
| 5,118,088 A | | 6/1992 | Sawdon | |
| 5,165,670 A | | 11/1992 | Sawdon | |
| 5,171,001 A | | 12/1992 | Sawdon | |
| 5,257,774 A | | 11/1993 | Dykstra | |
| 5,575,462 A | | 11/1996 | Blatt | |
| 5,884,903 A | | 3/1999 | Sawdon | |
| 5,967,502 A | | 10/1999 | Dykstra | |
| 6,059,277 A | | 5/2000 | Sawdon et al. | |
| 6,105,947 A | | 8/2000 | Dkykstra | |
| 6,115,898 A | | 9/2000 | Sawdon | |
| 6,119,843 A | | 9/2000 | Robinson | |

OTHER PUBLICATIONS

BTM Corporation Brochure entitled "Pneumatic Power Clamps", Catalog 01–C, (published prior to Sep. 26, 2002), entire brochure.

BTM Corporation Brochure entitled "Retracting Power Clamp", 98–RPC, (published prior to Sep. 26, 2002), entire brochure.

* cited by examiner

*Primary Examiner*—Robert C. Watson
(74) *Attorney, Agent, or Firm*—Harness, Dickey & Pierce, P.L.C.

(57) ABSTRACT

A clamping apparatus has a body and an elongated member that is extendable from the body. In another aspect of the present invention, a clamp has a workpiece engaging arm mounted adjacent an end of the elongated member. A further aspect of the present invention causes the elongated member to linearly extend and rotate when advanced.

40 Claims, 11 Drawing Sheets

CLAMP WITH SWINGING AND LINEAR MOTION

BACKGROUND AND SUMMARY OF THE INVENTION

The present invention relates generally to clamps and more specifically to an industrial clamp employing a swinging and linear motion.

Various industrial clamps have an arm which uses a linear and rotary motion. Examples of such conventional devices are disclosed within U.S. Pat. No. 6,059,277 entitled "Retracting Power Clamp" which issued to Sawdon et al. on May 9, 2000, and U.S. Pat. No. 5,165,670 entitled "Retracting Power Clamp" which issued to Sawdon on Nov. 24, 1992. Both of these patents are incorporated by reference herein. Other industrial clamps are known which have a piston rod and an externally mounted arm. The arm is linearly extendable along the piston rod axis and is rotatable only along a transverse plane perpendicular to the piston rod axis. These clamps, known as the 1500 Series and 2500 Series clamps from BTM Corp., are also pneumatically driven with a sealed body. While such traditional devices have significantly improved the art, additional and enhanced movement is often desirable in order to clear workpiece flanges or other obstructions during clamping or unclamping.

In accordance with the present invention, a clamping apparatus is provided that has a body and an elongated member that is extendable from the body. In another aspect of the present invention, a clamp has a workpiece engaging arm mounted adjacent an end of the elongated member. A further aspect of the present invention causes the elongated member to linearly extend and rotate when advanced. In yet another aspect of the present invention, a camming surface is provided in the body of the apparatus. An additional aspect of the present invention provides for improved fastening of the arm to the elongated member. A method of operating the clamp is also disclosed.

The clamp of the present invention is advantageous over conventional devices in that the present invention has an increased and enhanced range of motion during clamping and unclamping in order to clear workpiece flanges and other adjacent obstructions. The present invention is further advantageous by use of an automatically movable opening cover to minimize undesired contamination of the clamp body; this reduces dirt, dust, weld splatter and other external debris from otherwise entering the shaft opening, which could increase friction between moving parts and reduce durability of the clamp. The unique constructions and movement of the present invention cover allow the clamp to remain fully sealed when the workpiece arm is retracted, thereby retaining internal grease and excluding external contaminants. Furthermore, the camming surface design allows for simplified and reduced cost manufacturing and assembly while minimizing body openings that would otherwise need to be sealed. Moreover, the arm-to-shaft mounting arrangement of the present invention provides superior adjustability and fastening. Additional advantages and features of the present invention will become apparent from the following description and appended claims, taken in conjunction with the accompanying drawings.

DETAILED DESCRIPTION OF THE PREFERRED EMBODIMENT

Figure 1:
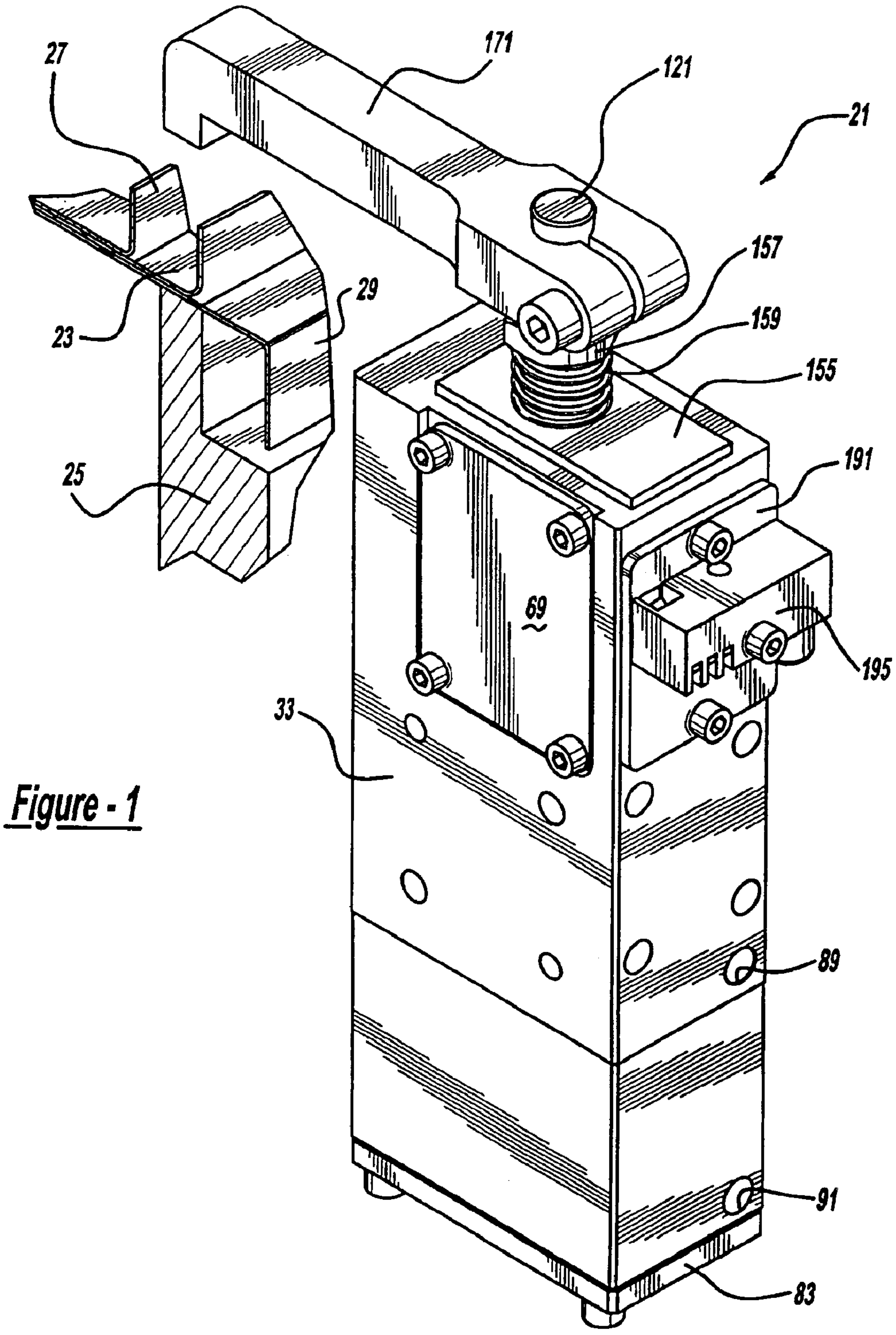
FIGS. 1 and 2 are perspective views showing the preferred embodiment clamp of the present invention in different movement positions.
Figure 2:
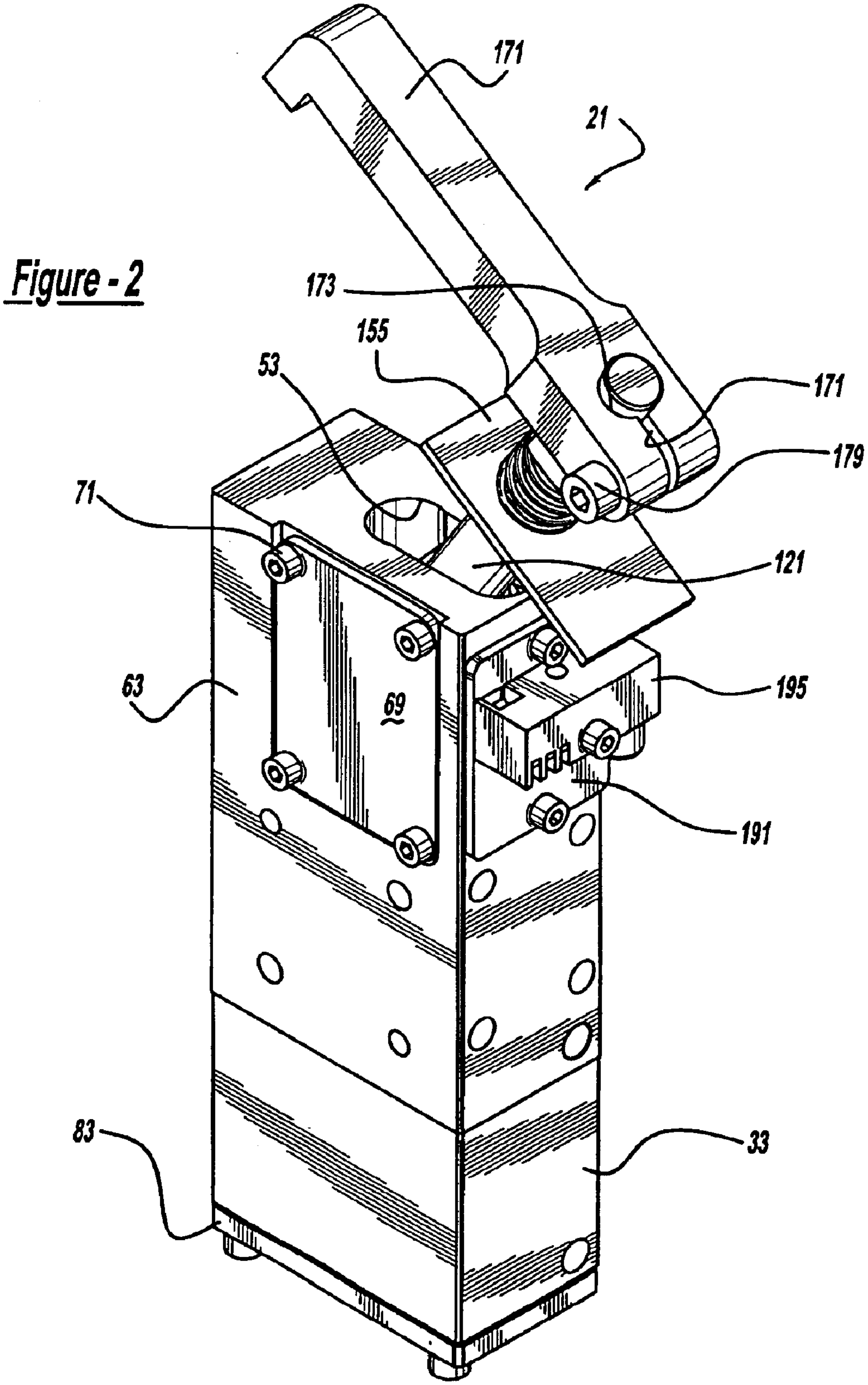
Figure 3:
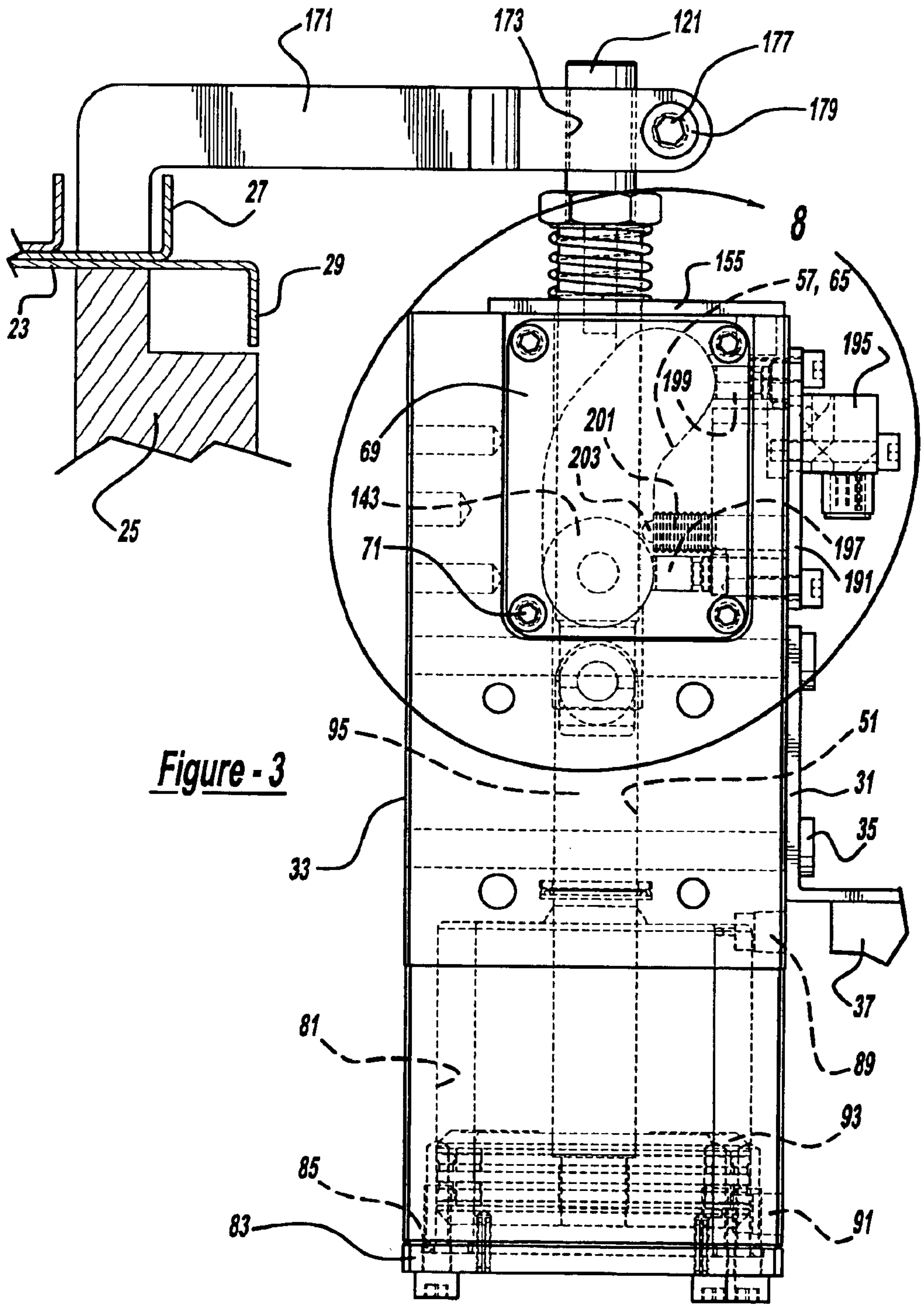
FIGS. 3–5 are side elevational views showing the preferred embodiment clamp in various positions.

Referring to FIGS. 1–3, the preferred embodiment of a clamp apparatus 21 of the present invention is used to clamp or otherwise engage a workpiece 23, such as an automotive vehicle panel, against a work surface 25 or fixture in an industrial manufacturing plant. Workpiece 23 typically has one or more sheets of steel with upturned flanges 27, downturned flanges 29 or alternately shaped surfaces which need to be secured together for welding, assembly or machining operations. A bracket 31 is mounted to any side surface of a body or housing 33 of clamp 21 by way of screws 35 or other removable fasteners. An arm of an articulated robot 37 or stationary, factory-floor mounted structure is secured to bracket 31 for respectively moving or maintaining the position of clamp 21 relative to one or more of workpieces 23.

As can best be observed in FIGS. 2, 3 and 6–8, clamp 21 has a single piece or unitary housing 33 cast and then machined from a single block of aluminum. A longitudinal bore 51 is machined within the center of body 33 and is accessible through an external opening 53 in a first end of body 33. A first camming surface 57, having a longitudinally extending leg 59 and a diagonally offset leg 61, is machined through an outside wall 63 of body 33 and openly communicates with bore 51. During manufacturing, a milling head is inserted through a first camming slot defined by first camming surface 57 and through the corresponding portion of bore 51 in order to machine a recessed, matching second camming surface 65 within an opposite second side wall 67 of body 33. A second camming slot defined by second camming surface 65, however, is recessed in and does not protrude all the way through the outside surface of side wall 67 such that a separately attached plate and seal are not required on the second side wall 67. Second camming surface 65 identically mirrors the shape of first camming surface 57. This preferred construction and manufacturing procedure allows for a unitary or one piece body to have a pair of opposed and integral camming surfaces as compared to prior devices which had bifurcated housings with somewhat less durable sealing and were prone to tolerance variations between halves leading to potential cam follower binding when assembled. A steel cover plate 69 is removable secured by screws 71 to an external side of body 33 to cover the first camming slot.

A piston cylinder 81 is machined into an end of body 33 opposite the end containing external opening 53. Piston cylinder 81 preferably has a generally oval cross sectional shape although a circular cross sectional shape can alternately be employed. Piston cylinder 81 is in communication with and coaxial with bore 51. An aluminum end cap 83 and elastomeric O-ring seal 85 are fastened by way of screws 87 to the end of body 33 adjacent piston cylinder 81. Pneumatic ports 89 and 91 are machined in the external surface of body 33 for attaching hoses and fittings to allow the entry and exit of pneumatic pressure into piston cylinder 81.

An oval shaped piston 93 and an elongated piston rod 95 coupled thereto longitudinally advance and retract in response to the selective use of pneumatic pressure through ports 89 and 91. Sets of elastomeric seals 97 and 99 are secured within grooves of piston 93 in order to seal piston against the internal surface of piston cylinder 81. An O-ring seal 101 is inserted within a cavity of body 33 adjacent bore 51 in order to seal piston rod 95 to body 33. Piston rod 95 at least partially slides in a linear longitudinal direction within bore 51.

A partially circular-cylindrical and elongated shaft 121 has a first bifurcated end 123 with a first hole 125 and a second hole 127. A reduced thickness end 129 of piston rod 95 rotatably fits within a channel formed within bifurcated end 123 of shaft 121. A pin 131 is located within holes 125 and 133 so as to drivably couple piston rod 95 to shaft 121. Another pin 141 fits within second hole 127 of shaft 121 to retain steel rollers 143 and 145 which serve as cam followers along camming surfaces 63 and 65, respectively.

An external end 151 of shaft 121 has a reduced diameter and a pair of opposed flats 153. A steel cover 155 is essentially a flat rectangle with an enclosed hole defined by a pair of lateral flat surfaces joined by rounded surfaces. The flat surfaces of the hole align with flats 153 of shaft 121 in order to locate cover relative to shaft 121 in a key-hole like manner throughout all shaft movement positions. End 151 of shaft 121 has at least a partially threaded section for receiving a jam nut 157. A compression spring 159 is disposed between nut 157 and cover 155 and serves to bias cover 155 against lower shoulders of flats 153 which coincide with the adjacent end of body 33 when shaft 121 is in its retracted position.

A workpiece engaging arm 171 has a proximal end segment within which is located a main aperture 173 with an opening axis concentric to the elongated axis of shaft 121 when assembled. A through-slot 175 connects main aperture 173 to an external surface of arm 171. Furthermore, a fastening hole 177 is transversely oriented within arm 171 to intersect slot 175. This arrangement allows arm 171 to be adjustably attached to shaft 121 by manually orienting arm 171 in any 360° position along a plane transverse to the elongated axis of shaft 121. End 151 of shaft 121 is preferably patterned with a continuous thread to match an internal thread in main aperture 173 of arm 171, however, a knurl pattern, spine pattern or even a smooth circular-cylindrical configuration can be employed on either or both mating surfaces. After arm 171 has been manually oriented relative to shaft 121 and end 151 has been inserted through main aperture 173, a screw 179 is inserted into hole 177. Screw 179 has threads that match corresponding threads within the far section of fastening hole 177, but has clearance to the oversized adjacent section of fastening hole 177. Screw 179 spans or bridges across slot 175 whereby manual rotation of screw 179 serves to compressibly tighten the main aperture of arm 171 around the circumference of shaft 121 in order to firmly secure one to the other. Arm 171 is preferably machined from steel and has an L-side view shape, but alternately, may have a straight configuration such as that shown in FIG. 7 which optionally allows for gripper pads (not shown) or other attachments to be secured to a distal end thereof.

A steel switch plate 191 is fastened to an external side of body 33 over a channel 193 machined into the body. An electrical proximity-type switch 195, preferably obtained from Turk Corp., is carried on switch plate 191 for indicating the fully retracted and advanced positions of the rollers, piston rod, shaft or any of the other associated movement mechanisms. Proximity sensors 197 and 199 are part of the switch and plate assembly.

Moreover, a compression spring 201 and detent ball 203 are compressed within a cavity in body 33. This provides a mechanical detenting action against the adjacent roller 143 when the roller is in its retracted position, which corresponds with the workpiece clamping position in the preferred embodiment; this encourages arm 171 to remain in its workpiece clamping position even when fluid pressure is undesirably lost or absent. Alternately, a compression spring contained within piston cylinder 81 can be employed instead of spring 201 in order to bias piston 93 toward its retracted position.

Figure 4:
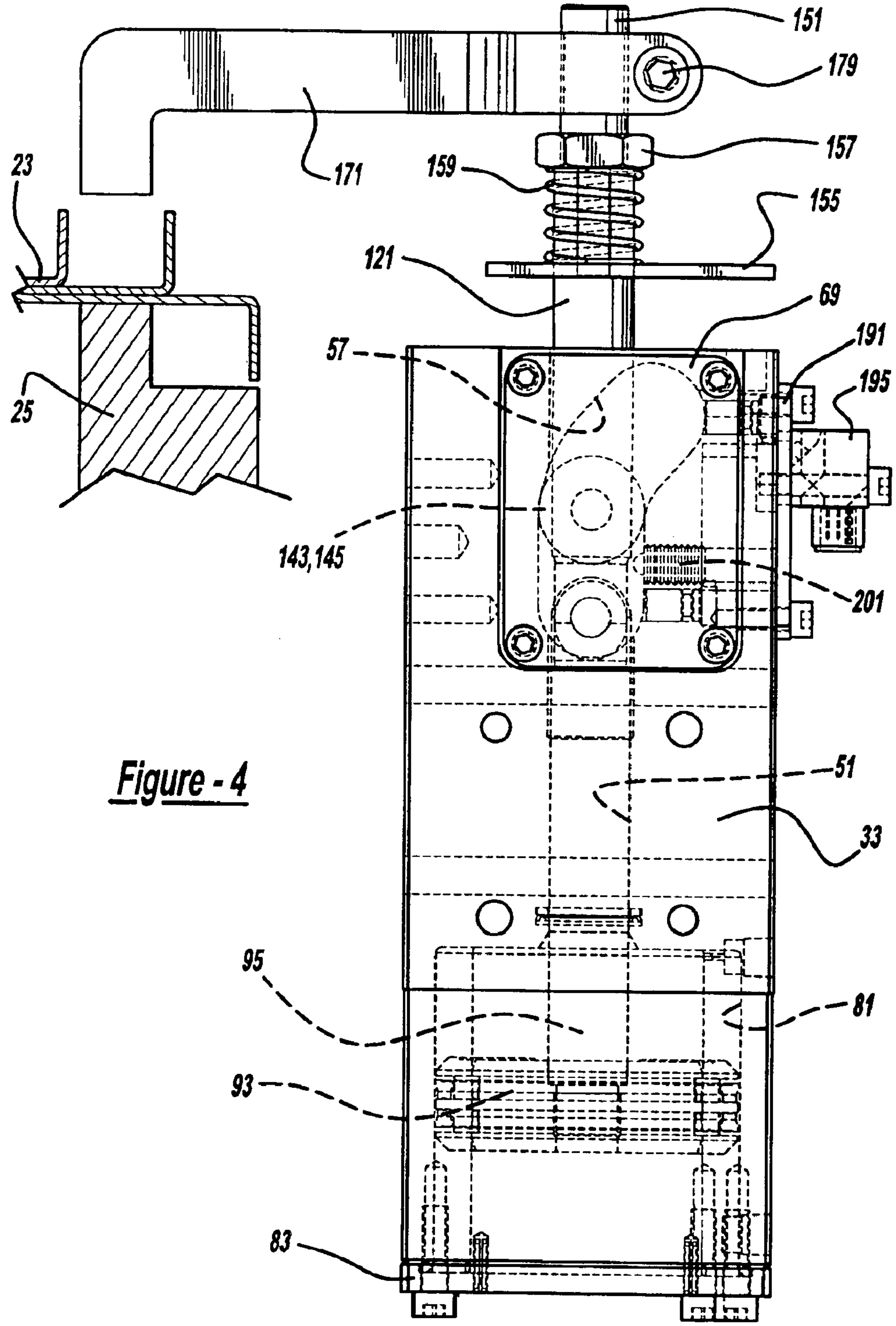
Figure 5:
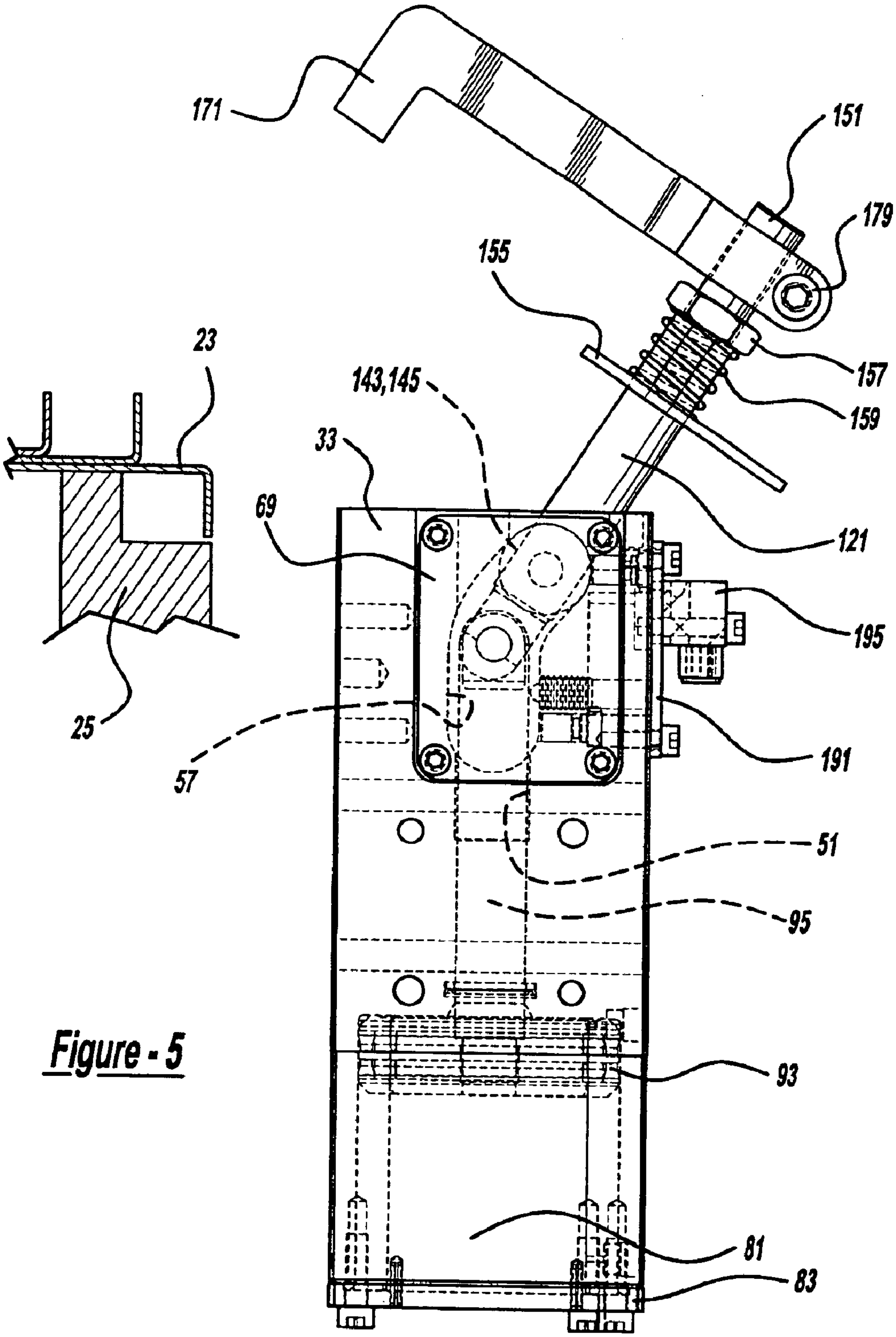
Figure 6:
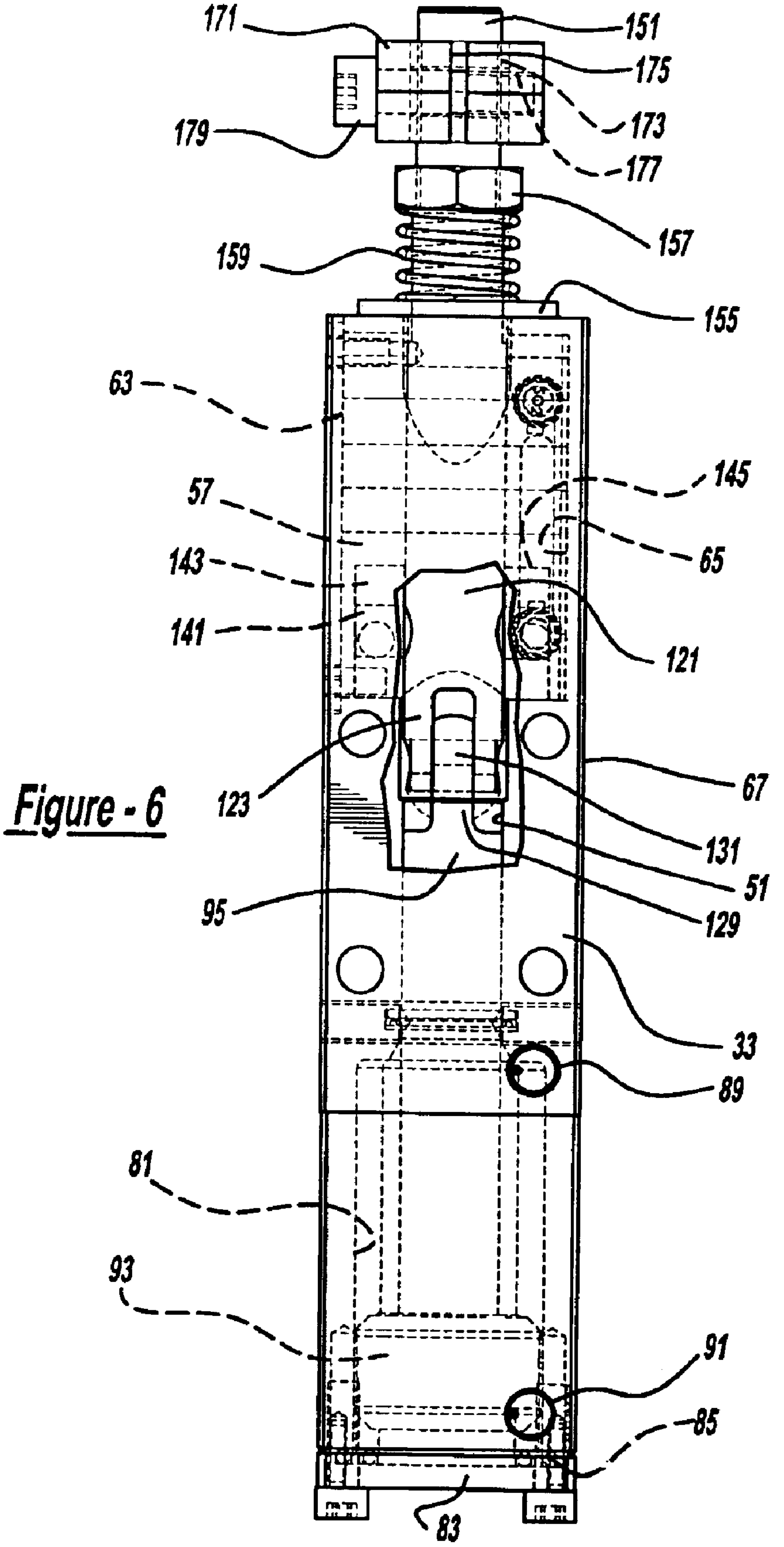
FIG. 6 is a side elevational view, taken 90 degrees to that of FIG. 3, showing the preferred embodiment clamp in a retracted position with a switch plate removed.
Figure 7:
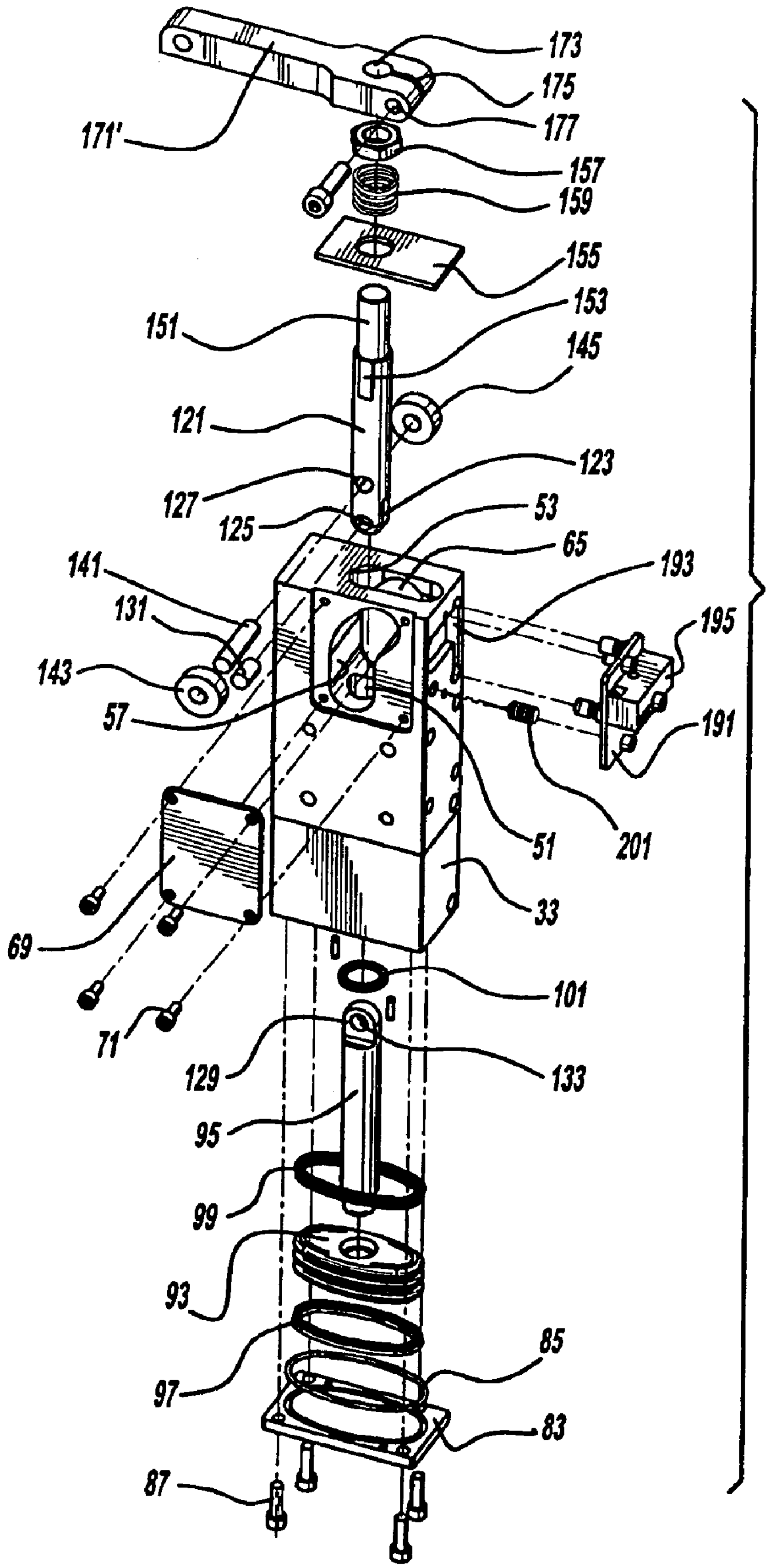
FIG. 7 is an exploded perspective view showing the preferred embodiment clamp, but with an alternately configured arm.
Figure 8:
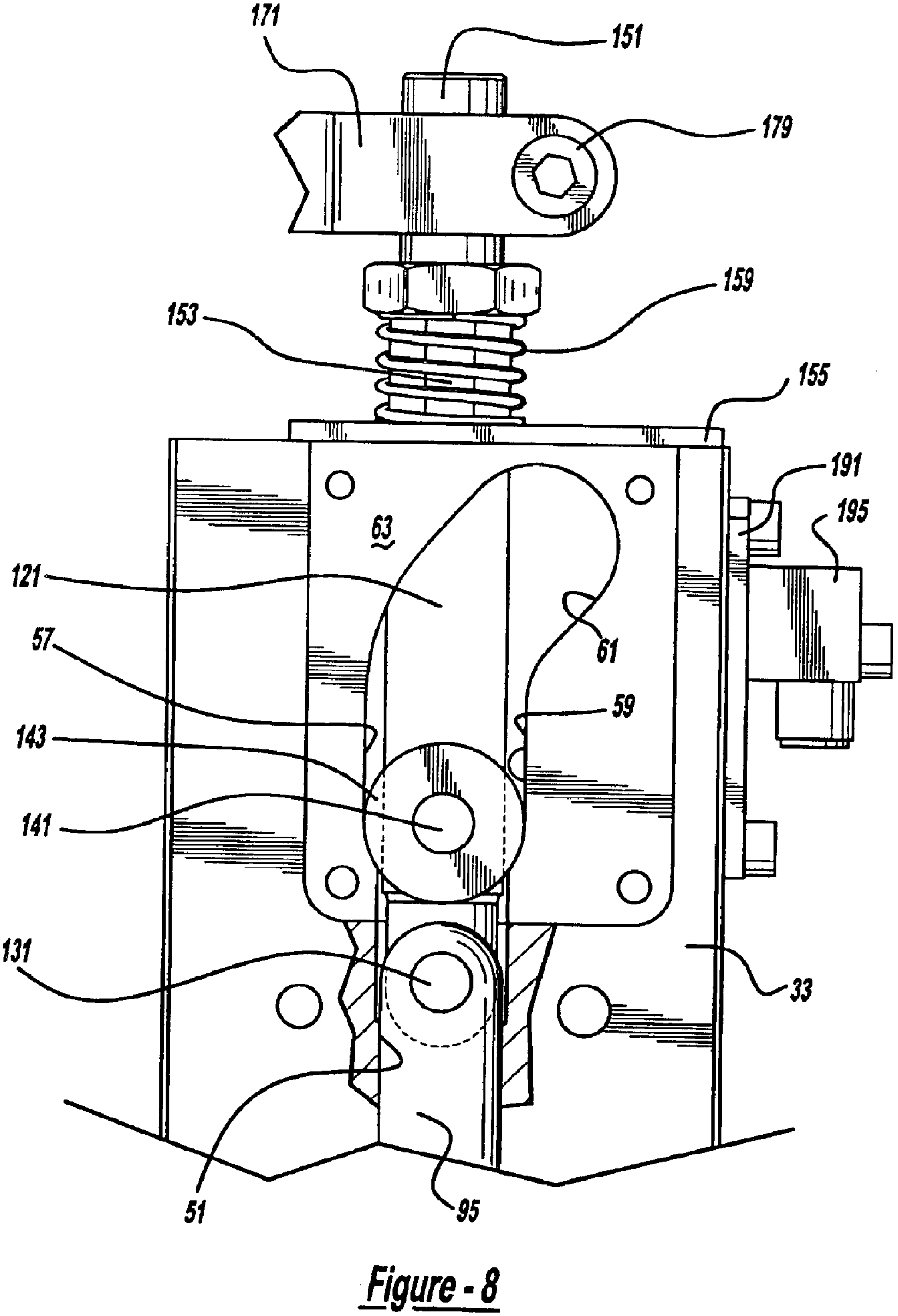
FIGS. 8–10 are enlarged and fragmentary side elevational views, taken within circle 8 of FIG. 3, showing the preferred embodiment clamp in different positions with a side plate removed.
Figure 9:
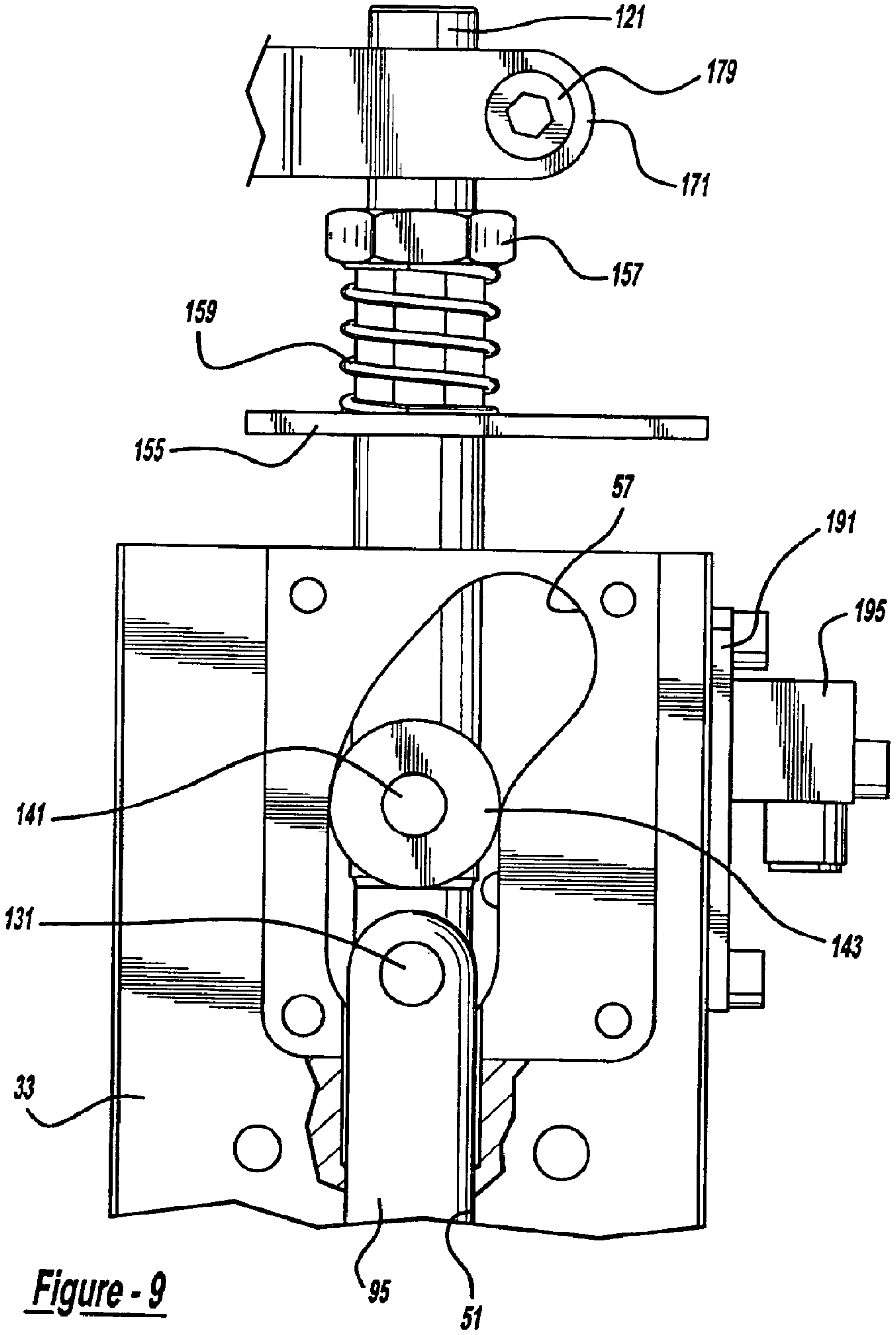
Figure 10:
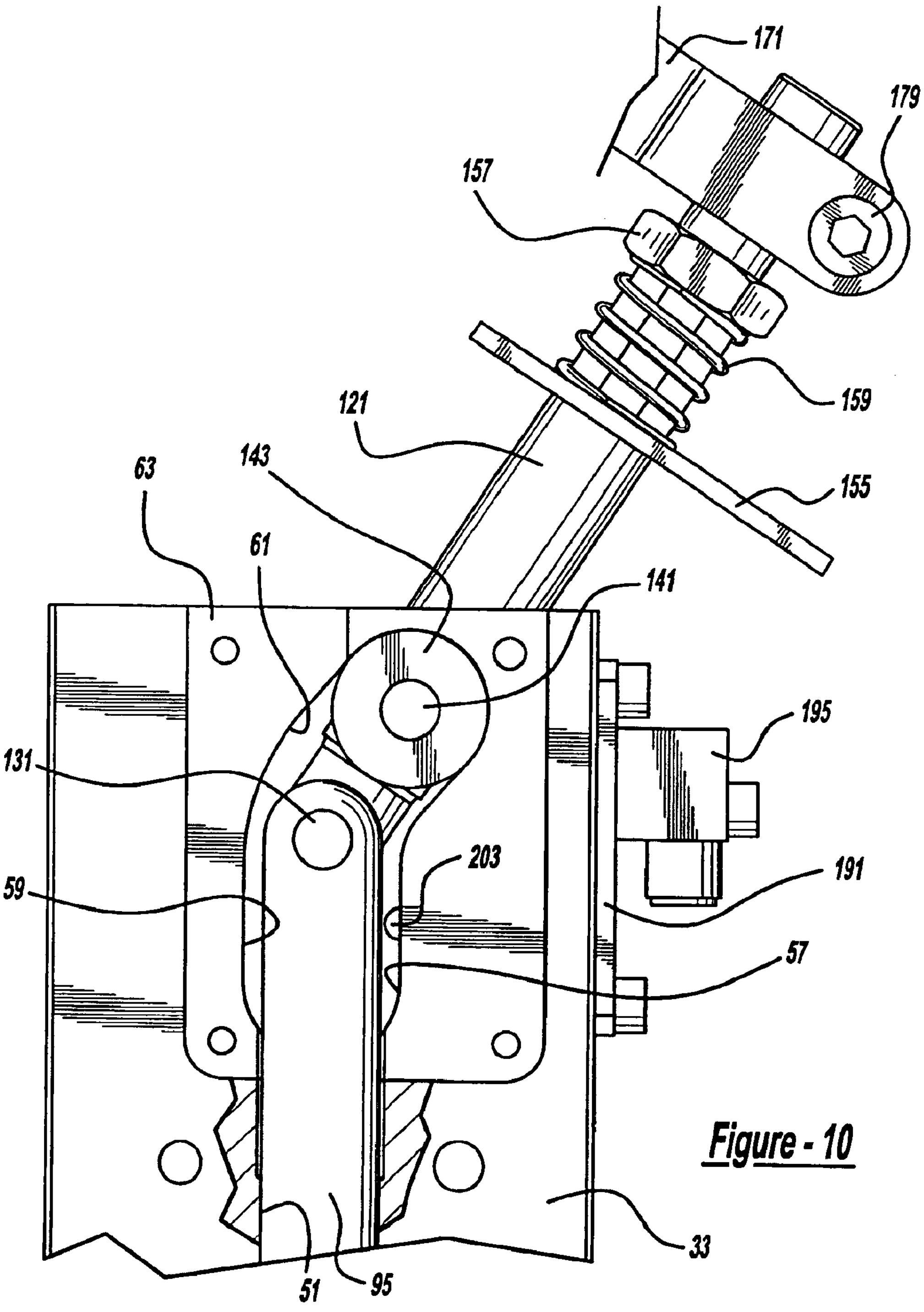

The operation of the present invention clamp apparatus 21 will now be described in greater detail. FIGS. 1, 3 and 8 show piston 93, piston rod 95, shaft 121 and arm 171 in a retracted position wherein arm 171 clamps against workpiece 23 and cover 155 is biased against the adjacent end of body 33. In this position, cover 155 is essentially sealed against body 33 to deter external contaminants from entering the shaft opening. Referring now to FIGS. 4 and 9, piston 93 automatically drives piston rod 95, shaft 121, cover 155 and arm 171 to a linearly extended and coaxial position. Rollers 143 and 145 are still within longitudinally extending leg 59 of each camming surface 57 and 65, respectively. Additionally, cover 155 is linearly moved away from the adjacent end of body 33. Subsequently, FIGS. 2, 5 and 10 illustrate the fully advanced position wherein piston 93 has automatically driven piston rod 95, shaft 121, cover 155 and arm 171 to a rotated position along the same longitudinal plane as the initial linear movement. Rollers 143 and 145 act with the corresponding offset camming surfaces of body 33 in order to cause this rotation in response to the further linear piston driving motion. This allows arm 171 to fully clear flanges 27 of workpiece 23 and to allow simplified vertical movement of workpiece 23 without undesirably contacting the disengaged and advanced clamp arm.

Figure 13:
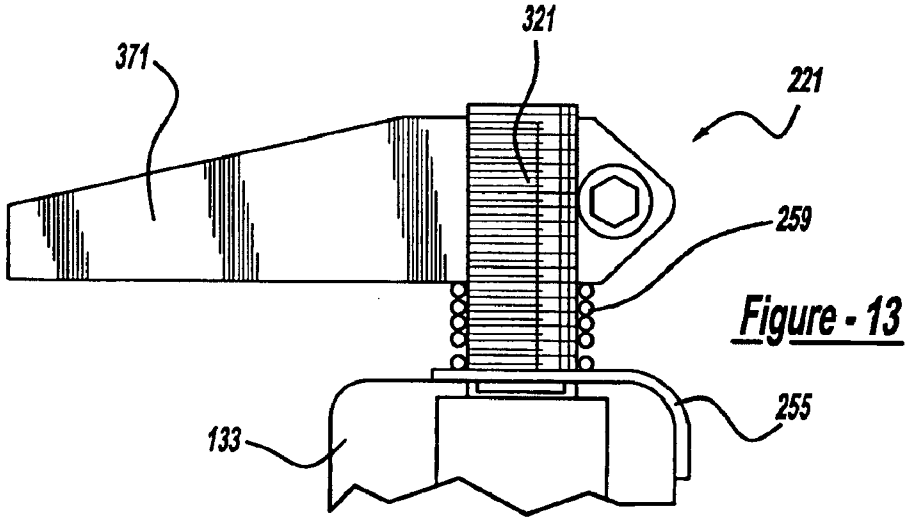
FIG. 13 is a fragmentary and diagrammatic side view showing a third alternate embodiment clamp of the present invention.

FIG. 13 shows an alternate embodiment clamp 221 of the present invention. This clamp is the same as the preferred embodiment clamp except that cover 255 has a generally flat first surface adjacent and generally perpendicular to an elongated direction of a shaft 321, and the cover further has a second surface generally perpendicular to the flat surface such that the cover essentially conceals an intersection between offset adjacent and external surfaces of a housing 133. This configuration allows for a longer external opening circumscribing the side and end intersection of body 133 to allow for even greater swinging rotation of shaft 321 and an attached arm 371. This embodiment also compresses a compression spring 259 directly between arm 371 and cover 255 without the use of an intervening nut 157.

Figure 11:
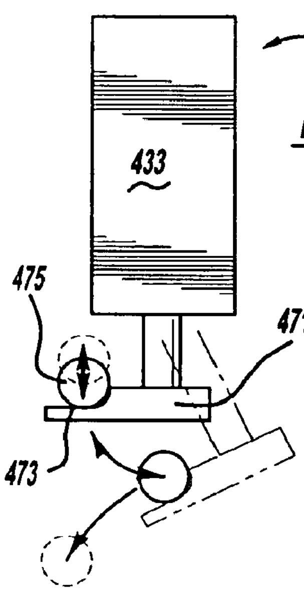
FIG. 11 is a diagrammatic side view showing a first alternate embodiment clamp of the present invention.

A second alternate embodiment clamp 401 can be observed in FIG. 11. The construction of clamp 401 in this embodiment is essentially the same as that for the preferred embodiment, but inverted. Clamp 401 also includes a cover (not shown). An arm 471, however, is differently configured with a scoop-like tapered, distal end 473 which rotates from an advanced position to an intermediate position in order to scoop beneath a workpiece 475. Subsequently, arm 471 is retracted toward a body 433 in a linear direction in order to lift workpiece 475. Clamp 401 can lower and then gently release workpiece 475 by reverse linear and then rotary movement.

Figure 12:
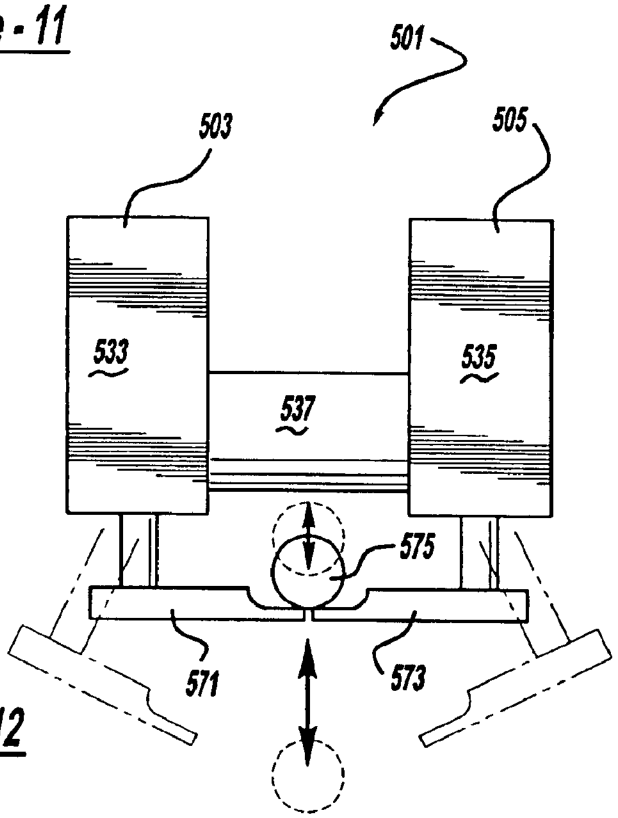
FIG. 12 is a diagrammatic side view showing a second alternate embodiment clamp of the present invention.

Referring now to FIG. 12, a third alternate embodiment clamp 501 of the present invention is shown. This embodiment employs a pair of inverted clamps 503 and 505 which are the same as that with the second alternate embodiment except that their respective bodies 533 and 535 are joined together by a frame 537 which also serves to space apart the clamps by a predetermined distance. Frame 537 can be movably carried by a robotic arm or stationarily fixed to a factory floor mounted structure. In operation, the opposed rotary and linear movement of the facing arms 571 and 573 allows for rotated engagement of a workpiece and then linear lifting of the workpiece 575 when the arms are moved from their advanced positions to their retracted positions in a simultaneous and automatic manner.

While various embodiments of the swinging and linear motion clamp have been disclosed, it should be appreciated that additional alternate constructions may fall within the scope of the present invention. For example, linkages and/or differently configured cam and cam follower mechanisms can be employed to achieve the presently disclosed clamp motion although many of the advantages of the present invention may not be realized. Furthermore, many other cover shapes and shaft openings can be used. It is envisioned that the camming and body construction and method of manufacturing same can be employed in other types of clamps having different arm motions and even without the preferred automatically moving cover. A separately attached piston cylinder can be provided in place of the preferred integral one discussed herein. It should also be appreciated that hydraulic fluid pressure or even electromagnetic actuation can be used although many of the advantages of the present invention may not be realized. While various materials, shapes and manufacturing processes have been disclosed, it will be appreciated that others can be also employed. It is intended by the following claims to cover these and any other departures from the disclosed embodiments which fall within the true spirit of this invention.

The invention claimed is:

1. A clamp comprising:

a housing having an external opening;

an automatic actuator;

an elongated shaft coupled to the automatic actuator and having a first end extending through the opening in the housing; and a cover attached to the shaft, the cover operably covering the opening in the housing around the shaft if the shaft is in a substantially retracted position;

the automatic actuator operably moving the first end of the shaft and the cover in a linearly extending and rotating manner if the shaft is moved from the retracted position to an advanced position.

2. The clamp of claim 1 further comprising a workpiece engaging arm mounted adjacent the first end of the shaft.

3. The clamp of claim 2 further comprising a biasing member located between the arm and the cover.

4. The clamp of claim 2 wherein the opening in the housing is located in an opposite end of the housing from the automatic actuator, the automatic actuator including a linearly moving piston and a piston rod.

5. The clamp of claim 2 wherein the arm is operable to lift a workpiece.

6. The clamp of claim 1 further comprising a camming mechanism coupled to the shaft.

7. The clamp of claim 6 wherein the automatic actuator and camming mechanism operably move the first end of the shaft and the cover in first a linear direction and subsequently in a rotated direction if the automatic actuator moves the shaft from the retracted position to the advanced position.

8. The clamp of claim 1 further comprising:

a roller; and a camming surface stationarily disposed in the housing;

wherein the automatic actuator includes a piston and a piston rod, the piston rod couples the shaft to the piston; and wherein the roller is attached to the shaft between the piston rod and the opening, the roller acts as a cam follower along the camming surface.

9. The clamp of claim 1 wherein the first end of the shaft is always located externally to the housing when the shaft is in its advanced and retracted positions.

10. The clamp of claim 1 wherein the housing is entirely enclosed if the shaft is in its retracted position, the cover serving to deter undesired contaminants from entering the opening in the housing if the shaft is in its retracted position.

11. The clamp of claim 1 wherein the cover has a substantially flat surface adjacent and substantially perpendicular to an elongated direction of the shaft, and the cover further has a second surface substantially perpendicular to the flat surface such that the cover substantially conceals an intersection between offset adjacent and external surfaces of the housing.

12. An industrial apparatus comprising:

a housing;

an automatic actuator;

an elongated member coupled to the automatic actuator and having at least a portion projecting external to the housing;

a workpiece engagable arm mounted to the member;

a cover attached to the member between the arm and the housing; and the automatic actuator operably causing the arm and the cover to linearly extend and rotate along the same plane when the arm is moved from a workpiece engaging position to a workpiece disengaging position.

13. The apparatus of claim 12 further comprising a camming mechanism coupled to the member and operably rotating a section of the member relative to the housing.

14. The apparatus of claim 13 wherein the automatic actuator and camming mechanism operably move the arm in first a linear direction and subsequently in a rotated direction if the automatic actuator moves the shaft from the engaging position to the disengaging position.

15. The apparatus of claim 12 wherein the automatic actuator includes a fluid powered piston.

16. The apparatus of claim 12 further comprising a biasing member located between the arm and the cover.

17. The apparatus of claim 12 wherein the arm is operable to lift a workpiece.

18. The apparatus of claim 12 wherein the housing is entirely enclosed if the member is in its retracted position, the cover serving to deter undesired contaminants from entering the opening in the housing if the member is in its retracted position, and the housing is substantially a single piece having a longitudinal bore within which the member moves, further comprising at least one plate removably mounted to an extemal side of the housing.

19. The apparatus of claim 12 further comprising an industrial robot operably moving the housing.

20. An industrial apparatus comprising:

a substantially single piece body having a longitudinally elongated bore;

a first camming surface located inside the body on a first side of the bore;

a second camming surface located inside the body on a second side of the bore substantially opposite the first camming surface;

an elongated member movably located in the bore of the body;

a workpiece engagable arm coupled to and operably driven by the member;

a first cam follower coupling the member to the first camming surface;

a second cam follower coupling the member to the second camming surface; and a plate secured to the body covering the first camming surface and deterring undesired contaminants from entering a camming slot defined by the first camming surface.

21. The apparatus of claim 20 further comprising a fluid powered piston operably driving the member.

22. An industrial apparatus comprising:

a substantially single piece body having a longitudinally elongated bore;

a first camming surface located inside the body on a first side of the bore;

a second camming surface located inside the body on a second side of the bore substantially opposite the first camming surface;

an elonuated member movably located in the bore of the body;

a workpiece engagable arm coupled to and operably driven by the member;

a first cam follower coupling the member to the first camming surface; and a second cam follower coupling the member to the second camming surface;

a piston cylinder located within the substantially one piece body; and an end cap enclosing an end of the piston cylinder.

23. The apparatus of claim 21 further comprising air pressure operably causing the piston and the member to advance and retract.

24. The apparatus of claim 22 further comprising a plate secured to the body covering the first camming surface and deterring undesired contaminants from entering a camming slot defined by the first camming surface.

25. The apparatus of claim 24 further comprising a permanently integral and external side surface of the body located adjacent to and externally concealing a second camming slot defined by the second camming surface.

26. The apparatus of claim 20 further comprising an automatic actuator operably driving the member, the member and the workpiece engaging arm being extendable from an end of the body substantially opposite the automatic actuator.

27. The apparatus of claim 26 wherein the camming surfaces each have a first leg substantially parallel to an advancing direction of the actuator and a second leg angularly offset from the first leg, the camming surfaces being integrally created as part of the body.

28. The apparatus of claim 20 wherein the first and second cam followers are rollers.

29. A clamp comprising:

a body;

an automatic actuator coupled to the body;

a member having an end extendable external to the body and a section located within the body, the member being coupled to and operably driven by the actuator;

a workpiece engagable arm having a main aperture with an opening axis, a slot connecting the main aperture to an external surface of the arm, and a fastening hole oriented substantially transverse to the opening axis;

a biasing member located between the arm and the body;

the member being located through the main aperture of the arm; and a fastener located in the fastening hole to bridge across the slot and compressibly secure the arm upon the member.

30. A clamp comprising:

a body;

an automatic actuator coupled to the body;

a member having an end extendable external to the body and a section located within the body, the member being coupled to and operably driven by the acuator;

a workpiece engagable arm having a main aperture with an opening axis, a slot connecting the main aperture to an external surface of the arm, and a fastening hole oriented substantially transverse to the opening axis;

the member being located through the main aperture of the arm; and a fastener located in the fastening hole to bridge across the slot and compressibly secure the arm upon the member;

wherein the arm is linearly extended away from the body and automatically rotated relative to the body when the actuator advances the member.

31. The clamp of claim 30 further comprising a biasing member located between the arm and the body.

32. The clamp of claim 29 wherein the biasing member is a compression spring.

33. A clamp comprising:

a body;

an automatic actuator couoled to the body;

a member having an end extendable external to the body and a section located within the body, the member being coupled to and operably driven by the actuator;

a workpiece enaaaable arm having a main aperture with an opening axis, a slot connecting the main aperture to an external surface of the arm, and a fastening hole oriented substantially transverse to the opening axis;

the member being located through the main aperture of the arm; and a fastener located in the fastening hole to bridge across the slot and compressibly secure the arm uoon the member;

wherein the end of the member is threaded and an internal surface of the main aperture is threaded.

34. A clamp comprising:

a body;

an automatic actuator coupled to the body;

a member havin an end extendable external to the body and a section located within the body, the member being coupled to and operably driven by the actuator;

a workpiece engageaable arm having a main aperture with an opening axis, a slot connecting the main aperture to an external surface of the arm, and a fastening hole oriented substantially transverse to the opening axis;

the member being located through the main aperture of the arm; and a fastener located in the fastening hole to bridge across the slot and compressibly secure the arm upon the member;

wherein an interior surface defining the fastening hole is threaded and the fastener is threaded.

35. The clamp of claim 29 wherein:

the actuator includes a fluid powered piston; and the arm is located adjacent an end of the body substantially opposite the piston.

36. The apparatus of claim 22 further comprising:

a fluid powered piston operably driving the member; and air pressure operably causing the piston and the member to advance and retract.

37. The apparatus of claim 22 wherein the camming surfaces each have a first leg substantially parallel to an advancing direction of the actuator and a second leg angularly offset from the first leg, the camming surfaces being integrally created as part of the body.

38. The clamp of claim 30 wherein:

the actuator includes a fluid powered piston; and the arm is located adjacent an end of the body substantially opposite the piston.

39. The clamp of claim 34 wherein:

the actuator includes a fluid powered piston; and the arm is located adjacent an end of the body substantially opposite the piston.

40. The clamp of claim 33 wherein:

the actuator includes a fluid powered piston; and the arm is located adjacent an end of the body substantially opposite the piston.

* * * * *